United States Patent
Kelly, deceased et al.

[15] 3,648,771
[45] Mar. 14, 1972

[54] IN SITU RECOVERY OF OIL FROM TAR SANDS USING OIL-EXTERNAL MICELLAR DISPERSIONS

[72] Inventors: Joe T. Kelly, deceased, late of Littleton, Colo. by La Verne S. Kelly, executrix; Fred H. Poettmann, Littleton, Colo.

[73] Assignee: Marathon Oil Company, Findlay, Ohio

[22] Filed: Dec. 29, 1969

[21] Appl. No.: 888,898

[52] U.S. Cl. ............................................ 166/272, 166/273
[51] Int. Cl. ................................... E21b 43/22, E21b 43/24
[58] Field of Search ............................... 166/268, 271–275; 208/11

[56] References Cited

UNITED STATES PATENTS

| | | | |
|---|---|---|---|
| 2,910,123 | 10/1959 | Elkins et al. | 166/271 |
| 3,221,813 | 12/1965 | Closmann et al. | 166/271 |
| 3,342,261 | 9/1967 | Bond | 166/271 X |
| 3,343,597 | 9/1967 | Gogarty et al. | 166/274 X |
| 3,375,870 | 4/1968 | Satter et al. | 166/271 X |
| 3,392,105 | 7/1968 | Poettmann et al. | 208/11 |
| 3,504,744 | 4/1970 | Davis et al. | 166/274 X |
| 3,507,331 | 4/1970 | Jones | 166/274 X |

Primary Examiner—Jan A. Calvert
Attorney—Joseph C. Herring, Richard C. Willson, Jr. and Jack L. Hummel

[57] ABSTRACT

Oil from subsurface tar sands having an injection means in fluid communication with a production means is recovered by injecting an oil-external micellar dispersion at a temperature above 100°. into the tar sands and displacing it toward the production means to recover hydrocarbon through the production means. The micellar dispersion can be preceded by a slug of hot water (e.g., above 100° F.) and the water can have a pH greater than about 7. Also, the water within the micellar dispersion can have a pH of about 7–14; and, preferably the dispersion is at a temperature greater than about 150° F. The micellar dispersion contains hydrocarbon, surfactant, aqueous medium, and optionally cosurfactant and/or electrolyte.

18 Claims, No Drawings

IN SITU RECOVERY OF OIL FROM TAR SANDS USING OIL-EXTERNAL MICELLAR DISPERSIONS

BACKGROUND OF THE INVENTION

Tar sands, also known as oil sands and bituminous sands, are sands that contain a very viscous hydrocarbon. One of the largest deposits is the Athabasca sands found in Northern Aberta, Canada. These sands have an asphaltic appearance due to the viscous hydrocarbon. In general, tar sands contain a very viscous oil or hydrocarbon which is substantially more viscous than the average crude oil found in subterranean formation, including low API° gravity crude oil.

It is known in the prior art that oil from tar sands can be recovered by first flooding with steam and then flooding with a solution containing sodium hydroxide. The sodium hydroxide aids in emulsification of the viscous oil.

U.S. Pat. No. 2,882,973 to Doscher et al. teaches in situ recovery of oil from tar sands using an aqueous solution containing a non-ionic surface-active agent and optionally a neutral salt, the solution at a pH above 12. Examples of useful non-ionic surfactants include oil-soluble monohydric alcohols, oil-soluble dihydric alcohols, and oil-soluble alcohols containing substituents such as ether and/or ester groups. The non-ionic surfactant is present in sufficient concentration to effect instantaneous emulsion of the oil and to maintain the oil in the emulsified state. Concentrations of 0.1 percent–5 percent by weight are effective for this purpose. The high pH is obtained using alkali metal hydroxide or ammonia.

Also, in situ combustion methods are useful to recover oil from oil sands. The fire front distills the oil ahead of it and the coke deposited by the destructive distillation is the major source for the combustion. The heat, the diluting action of the distillate formed, and the drive of the combustion gases all act to move the viscous hydrocarbon toward a production well in fluid communication with the combustion process.

SUMMARY OF THE INVENTION

Applicant has discovered a novel method of recovering oil from tar sands by injecting an oil-external micellar dispersion into the tar sand reservoir and displacing it through the reservoir toward a production means in fluid communication with the tar sands. The oil-external micellar dispersion contains hydrocarbon, surfactant, and aqueous medium. The water within the dispersion can have a pH of about 7–14. Also, the micellar dispersion can be preceded by a hot water flood, the water flood can optionally be at a pH greater than 7. In addition, the micellar dispersion can be followed by a mobility buffer and this, in turn, followed by a drive material, e.g., water or hydrocarbon. The mobility buffer acts to impart a more stable flow to the process.

DESCRIPTION OF THE PREFERRED EMBODIMENTS

The oil-external micellar dispersion is comprised of hydrocarbon, surfactant, and aqueous medium. Optionally, alcohol and/or electrolyte can be incorporated. Examples of volume amounts include about 4 percent to about 50 percent hydrocarbon, about 10 percent to about 90 percent aqueous medium, at least about 4 percent surfactant, about 0.01 to about 20 percent cosurfactant, and about 0.001 percent to about 5 percent by weight of electrolyte. In addition, the dispersion can contain other additives such as corrosion inhibiting agents, bactericides, sequestering agents, etc.

Examples of useful hydrocarbons include crude oil, partially refined fractions of crude oil, e.g., side cuts from crude columns, crude column overheads, gas oils, kerosenes, heavy naphthas, naphthas, straight-run gasoline, liquefied petroleum gases, etc.; and refined fractions of crude oil including propane, pentane, decane, dodecane, aryl compounds such as benzene, naphthalene, anthracene, and substituted products thereof. Also, the hydrocarbon can be a synthesized hydrocarbon. In addition, the unsulfonated hydrocarbon in petroleum sulfonates is useful as the hydrocarbon.

The aqueous medium can be soft, brackish, or brine water. Preferably, the water is soft but it can contain salts which are compatible with the ions within the tar sands.

The surfactant can be anionic, cationic or nonionic. Examples of useful surfactants include those found in U.S. Pat. No. 3,254,714 to Gogarty et al. Especially useful surfactants are the petroleum sulfonates, also known as alkyl aryl naphthenic sulfonates. Preferred petroleum sulfonates include those having an average equivalent weight of about 350 to about 520 and more preferably about 400 to about 460. The sulfonate is preferably one containing a monovalent cation. Mixtures of different surfactants as well as mixtures of high, medium, and low average equivalent weight surfactants are useful.

The cosurfactant (also known as semipolar organic compound and cosolubilizer) can have different degrees of water solubility. Preferably, the water solubility of the cosurfactant is about 0.1 percent to about 20 percent or more and more preferably about 1 percent to about 5 percent at ambient temperature. Examples of useful cosurfactants include alcohols, amino compounds, esters, aldehydes, ketones and like compounds containing from one to about 20 or more carbon atoms and more preferably about three to 16 carbons atoms. Specific examples of useful alcohols include isopropanol, n- and isobutanol, the amyl alcohols such as n-amyl alcohol, 1- and 2-hexanol, 1- and 2- octanol, decyl alcohols, alkaryl alcohols, alcoholic liquors such as fusel oil, etc. The alcohols can be primary, secondary, and tertiary alcohols. Preferably, concentrations of about 0.01 percent to about 5 percent by volume are useful and more preferably about 0.1 percent to about 3 percent. Mixtures of two or more different cosurfactants are useful.

The electrolyte useful in the oil-external micellar dispersions include inorganic bases, inorganic acids, and inorganic salts, organic bases, organic acids, and organic salts, which are either weakly or strongly ionized. Preferably the electrolytes are inorganic bases, inorganic acids, and inorganic salts, e.g., sodium hydroxide, sodium chloride, sodium sulfate, hydrochloric acid, sulfuric acid, sodium nitrate, ammonium hydroxide, etc. Examples of other useful electrolytes are found in U.S. Pat. No. 3,330,343. Preferably, the electrolyte is one that will yield a high pH, e.g., sodium hydroxide and like materials.

Specific examples of useful micellar dispersions include those taught in copending patent application identified as U.S. Ser. No. 693,177, filed Dec. 26, 1967 and in U.S. Pat. No. 3,254,714 to Gogarty et al.

Preferably the pH of the water within the micellar dispersion is within the range of about 7–14 and more preferably about 12. The desired pH can be obtained by adding the appropriate electrolyte, e.g., NaOH, NH$_4$OH, etc.

Also, the temperature of the micellar dispersion is preferably above about 100° F. and more preferably above about 150° F. This can be effected by heating the micellar dispersion before injecting it into the injection means. Also, high temperatures due to subterranean conditions can be utilized to heat the micellar dispersion as it progresses down the well bore. Where the micellar dispersion is to be used at these higher temperatures, the components of the dispersion are preferably designed to obtain a stable dispersion at the high temperatures. For example, increasing the aromaticity of the hydrocarbon, increasing the electrolyte content, increasing the molecular weight of the surfactant and/or alcohol, etc., are ways to obtain dispersions stable at high temperatures. Specific methods to obtain thermostability ranges at higher temperatures are taught in copending patent applications identified as U.S. Ser. Nos. 746,258, filed 7/22/68, now U.S. Pat. No. 3,493,048 to Jones; 746,252, filed 7/22/68, now U.S. Pat. No. 3,493,047 to Davis et al.; 746,391, filed 7/22/68, now U.S. Pat. No. 3,495,660 to Davis et al.; 754,524, filed 7/22/68, now U.S. Pat. No. 3,500,912 to Davis et al.; and 746,390, filed 7/22/68, now U.S. Pat. No. 3,508,611 to Davis et al.

The oil-external micellar dispersion can be preceded by a water slug. The water slug can be and preferably is at a temperature greater than 100° F. and more preferably greater than about 150° F, the water slug is at this temperature before entering the formation. Also, the pH of the water slug can be within the range of about 7–14. Higher pHs are useful to aid in the emulsification of the oil from the tar sands. The high pH can be obtained by adding water-soluble bases, e.g., NaOH, NH₄OH, etc., to the aqueous preslug. Formation pore volumes of the aqueous preslug up to about 1 pore volume and greater are useful.

The effective mobility of the micellar dispersion in the tar sands can be decreased to give a more stable fluid flow to reduce or inhibit fingering. Such can be obtained by adjusting the components within the micellar dispersion to obtain a desired viscosity.

The micellar dispersion can be followed by a drive material. Optionally, a mobility buffer can be injected behind the micellar dispersion and this, in turn, followed by the drive material. Examples of useful mobility buffers include aqueous and nonaqueous fluids containing mobility reducing agents such as high-molecular weight, partially hydrolyzed polyacrylamides, polysaccharides, polyisobutylenes, etc. Any mobility reducing agent is useful as long as it is compatible with the tar sands and does effectively reduce the mobility of the aqueous or non-aqueous mobility buffer slug. The mobility buffer reduces the tendency of the drive material to finger into the micellar dispersion.

ples are prepared at room temperature with minimal agitation. The compositions of the micellar dispersions are indicated in Table I:

What is claimed is:

1. A process of recovering oil from sub-surface tar sands having at least one injection means in fluid communication with at least one production means, comprising heating an oil-external micellar dispersion to a temperature above about 100° F., injecting the heated micellar dispersion into the tar sands and displacing the micellar dispersion toward at least one of the production means and recovering oil through said production means.

2. The process of claim 1 wherein the water phase within the micellar dispersion has a pH within the range of about 7 to about 14.

3. The process of claim 1 wherein a slug of hot water precedes the injection of the micellar dispersion.

4. The process of claim 3 wherein the pH of the water is above about 7.

5. The process of claim 1 wherein the micellar dispersion is comprised of hydrocarbon, surfactant, and aqueous medium.

6. The process of claim 5 wherein the micellar dispersion contains cosurfactant and/or electrolyte.

7. The process of claim 1 wherein a mobility buffer is injected after the micellar dispersion.

TABLE I

| Sample | Surfactant | | Hydrocarbon | | Aqueous medium | | Cosurfactant | |
|---|---|---|---|---|---|---|---|---|
| | Percent | Type | Percent | Type | Percent | Type | Ml. 100 ml. | Type |
| A | 5.2 | Ammonium petroleum sulfonate (average EqW=440, 81% active). | 24.75 | Crude oil | 70 | {60% Henry plant water.[3] 40% Palestine water.[4]} | 0.08 0.25 | n-Amyl alcohol. Isopropanol. |
| B | 10 | "Pyronate 50"[1] | 20 | do | 70 | {60% Henry plant water. 40% Palestine water.} | 3.25 | n-Hexanol. |
| C | 10 | "Petronate L"[2] | 20 | Straight-run gasoline. | 70 | {60% Henry plant water. 40% Palestine water.} | 4.25 | n-Amyl alcohol. |
| D | 20 | "Duponol WAQE" | 10 | do | 70 | Distilled water | 14 | i-Amyl alcohol. |
| E | 10 | "Energetic W-100" | 20 | do | 70 | do | 8.5 | Do. |
| F | 10 | "Triton X-100" | 20 | do | 70 | do | 5.5 | Do. |
| G | 20 | "Arquad 12-50" | 10 | do | 70 | do | 17.0 | Do. |
| H | 16.6 | Sodium petroleum sulfonate (avg. EqW=465, 62% active). | 16.6 | do | 66.6 | do | 1.3 | Isopropanol. |
| I | 10 | Ammonium petroleum sulfonate (avg. EqW=440, 81% active). | 5 | Crude oil | 85 | {60% Palestine water. 40% Henry plant water.} | 2.5 | n-Amyl alcohol. |
| J | 7.4 | Sulfonate defined in Example H | 49.6 | Straight-run gasoline. | 43 | Water containing 500 p.p.m. dissolved solids. | | |
| K | 11.6 | do | 60.6 | do | 24 | Water defined in Example J. | | 3.8% isopropanol. |
| L | 12.6 | do | 51.0 | Pentane | 33 | do | | 3.4% isopropanol. |

[1] Pyronate 50, a sodium petroleum sulfonate, average equivalent weight 350. Sold by Sonneborn Chemical Co., 300 Park Avenue South, New York, New York, 10010.

[2] Petronate L, a sodium petroleum sulfonate, average equivalent weight 422. Sold by Sonneborn Chemical Co., 300 Park Avenue South, New York, New York, 10010.

[3] Henry plant water is obtained from the Henry lease in Illinois; contains about 18,000 p.p.m. of dissolved salts.

[4] Palestine water is obtained from the Palestine water reservoir in Palestine, Illinois; contains about 420 p.p.m. of dissolved salts.

NOTE.—The amount of cosurfactant is based on ml. of cosurfactant per 100 ml. of liquid containing surfactant, hydrocarbon and aqueous medium—except in examples K and L wherein the amount of alcohol is based on percent of the total volume of dispersions.

As mentioned previously, the micellar dispersion can be followed by a drive material. The drive material can be aqueous or non-aqueous and can be liquid, gas or a combination of the two. Preferably, it is an aqueous drive material. The drive material can contain ions, but the ions are preferably compatible with the ions within the subterranean formation.

Formation pore volume amounts of about 1 percent to about 30 percent or more of the oil-external micellar dispersion are useful with this invention. More preferably, about 1 percent to about 10 percent formation pore volume is useful. The mobility buffer can be present in amounts of about less than 5 percent to about 75 percent or more formation pore volume.

It is not intended that the invention be limited by the specifics taught above. Rather, all equivalents obvious to those skilled in the art are intended to be included within the scope of the invention as defined within the specification and appended claims.

EXAMPLE 1

This example is presented to show specific examples of micellar dispersions useful with this invention. These exam- 8. The process of claim 1 wherein a drive material is used to displace the micellar dispersion through the tar sands toward the production means.

9. A process of recovering oil from sub-surface tar sands having at least one injection means in fluid communication with at least one production means, comprising:
1. heating an oil-external micellar dispersion to a temperature above about 100° F., injecting about 1 percent to about 30 percent formation pore volume of the heated oil-external micellar dispersion into the tar sands,
2. thereafter, injecting about 5 percent to about 75 percent formation pore volume of a mobility buffer into the tar sands and
3. then injecting sufficient drive material to displace the micellar dispersion and mobility buffer toward the production means and recovering oil through the production means.

10. The process of claim 9 wherein up to about 100 percent formation pore volume of an aqueous preslug is injected into the tar sands before the micellar dispersion is injected.

11. The process of claim 10 wherein the pH of the aqueous preslug is within the range of about 7 to about 14.

12. The process of claim 9 wherein the micellar dispersion is comprised of hydrocarbon, surfactant, and aqueous medium.

13. The process of claim 12 wherein the micellar dispersion contains cosurfactant and/or electrolyte.

14. The process of claim 12 wherein the surfactant is petroleum sulfonate.

15. The process of claim 9 wherein the mobility buffer is an aqueous solution containing a mobility reducing agent.

16. The process of claim 9 wherein the drive material is aqueous.

17. The process of claim 9 wherein the micellar dispersion is heated to a temperature above about 150° F.

18. The process of claim 9 wherein the water phase within the micellar dispersion has a pH within the range of about 7 to about 14.